(12) United States Patent
Linev

(10) Patent No.: US 7,397,892 B2
(45) Date of Patent: Jul. 8, 2008

(54) SECURITY ENTRANCE SYSTEM

(75) Inventor: Vladimir N. Linev, Minsk (BY)

(73) Assignee: Nauchno-Proizvodstvennoe Chastnoe Unitarnoe Predprijatie ADANI, Minsk (BY)

( * ) Notice: Subject to any disclaimer, the term of this patent is extended or adjusted under 35 U.S.C. 154(b) by 0 days.

(21) Appl. No.: 11/686,340

(22) Filed: Mar. 14, 2007

(65) Prior Publication Data

US 2007/0153382 A1  Jul. 5, 2007

Related U.S. Application Data

(63) Continuation of application No. PCT/BY2005/000007, filed on Aug. 5, 2005.

(30) Foreign Application Priority Data

Aug. 9, 2004  (BY) ................. A 20040750

(51) Int. Cl.
G01N 23/04 (2006.01)
G01B 15/02 (2006.01)
G21K 5/10 (2006.01)

(52) U.S. Cl. .................. 378/57; 378/98.8; 378/146

(58) Field of Classification Search ............... 378/54, 378/57–59, 62, 98.8, 146, 145, 189, 208
See application file for complete search history.

(56) References Cited

U.S. PATENT DOCUMENTS

| | | | | |
|---|---|---|---|---|
| 4,586,441 A * | 5/1986 | Zekich | ............... | 109/8 |
| 5,040,199 A | 8/1991 | Stein | | |
| 5,404,387 A | 4/1995 | Hammond et al. | | |
| 5,668,342 A * | 9/1997 | Discher | ............... | 86/50 |
| 6,094,472 A * | 7/2000 | Smith | ............... | 378/86 |
| 6,472,984 B1 | 10/2002 | Risi | | |
| 7,062,011 B1 * | 6/2006 | Tybinkowski et al. | ......... | 378/57 |
| 2003/0020607 A1 | 1/2003 | Risi | | |
| 2004/0134986 A1 | 7/2004 | Studer et al. | | |

FOREIGN PATENT DOCUMENTS

| | | | |
|---|---|---|---|
| DE | 4335202 A1 * | 4/1995 | |
| DE | 19817396 A1 | 10/1999 | |
| FR | 2831308 A1 | 4/2003 | |

(Continued)

OTHER PUBLICATIONS

International Search Report from International Application No. PCT/BY2005/000007, filed on Aug. 5, 2005, mailed Oct. 5, 2005.

*Primary Examiner*—Irakli Kiknadze
(74) *Attorney, Agent, or Firm*—Houston Eliseeva LLP

(57) ABSTRACT

The invention is related to the systems of so-called "security entrance" and, in particular, to the systems for preventing the entry of forbidden articles and/or substances from an unprotected area to a protected one. The simplicity, efficiency and secrecy of examination in a security system for preventing the entry of forbidden articles and/or substances from a surrounding area to a protected one, said system comprised of a partitioning separating a protected area from an unprotected one, at least, one walk-gate made in said partitioning, an information control-and-processing device and a detector of forbidden articles and/or substances is achieved due to said detector of forbidden articles and/or substances made an X-ray kind to provide secret examination of every person passing through said walk-gate.

10 Claims, 4 Drawing Sheets

FOREIGN PATENT DOCUMENTS

| | | |
|---|---|---|
| GB | 2287164 A | 9/1995 |
| JP | 2004069576 | 3/2004 |
| WO | 9921148 A1 | 4/1999 |
| WO | 9939189 A2 | 8/1999 |
| WO | 0207306 A1 | 1/2002 |
| WO | 03029844 A2 | 4/2003 |

* cited by examiner

SECURITY ENTRANCE SYSTEM

RELATED APPLICATIONS

This application is a Continuation of PCT application serial number PCT/BY2005/000007 filed on Aug. 5, 2005 (which was published in English under PCT Article 21(2) as International Publication No. WO 2006/015471 A1) which in turn claims priority to Belarus patent application number a 20040750 filed Aug. 9, 2004 both of which are incorporated herein by reference in their entirety.

BACKGROUND OF THE INVENTION

The invention is related to the systems of so-called "security entrance" and, in particular, to the systems for preventing the entry of forbidden articles and/or substances from an unprotected area to a protected one.

Known are a number of "security entrance" systems based on various concepts such as monitoring the entrance by means of radar devices [DE 19817396, Int. Cl.: G08B13/183, G01S13/04, Published Oct. 21, 1999] or the use of the pass cards equipped with IR-radiators [FR2831308, Int. Cl.: G08B13/19, Published Apr. 25, 2003]. Such systems make it possible to restrict the access to the protected area of the strangers but they are not suitable for providing a security entrance when most of those entering are casual visitors to the place like in the airports, railway terminals, bus stations as well as in the banks, large trading centers etc. These places nowadays present the greatest danger from the viewpoint of their susceptibility to various unlawful acts contemplating the use of both metal and plastic weapons including plastic explosives.

Known are the systems of security entrance employing a number of various methods that make it possible to reveal the attempts of entry of the weapons, explosives or drugs to the protected area. In [International Application WO9921148, Int.Cl.:G01V11/00, G01BV5/00, G08B23/00, G01N23/04, Published Apr. 29, 1999] there is described a sequential passage through a metal detector, a gas analyzer performing the analysis of the air samples from a person under examination and monitoring by means of ultrasonic radar sets. The possibility is provided to perform an X-ray check of hand luggage (bags, briefcases etc) but not the human check. Besides its lack of secrecy this kind of monitoring is also a very expensive one.

Not less complicated is a system of security entrance [U.S. Pat. No. 6,472,984, Int.Cl.:G08B21/00, Published Oct. 29, 2002] wherein a partitioning separating a protected area from an unprotected one is equipped with two or three walk-gates each provided with an appropriate door. A metal detector is used as a detector of forbidden articles. There is also available a weight control device of an examination zone and an information control-and-processing device.

Besides being very complicated and expensive such system do not provide the required secrecy of examination.

SUMMARY OF THE INVENTION

It is the aim of the present invention to design a comprehensive security system providing secret examination of every person passing through a walk-gate.

This aim is achieved by means of a security system for preventing the entry of forbidden articles and/or substances from a surrounding area to a protected one, said system comprised of a partitioning separating a protected area from an unprotected one, at least, one walk-gate made in said partitioning, an information control-and-processing device and a detector of forbidden articles and/or substances, wherein said detector of forbidden articles and/or substances is made an X-ray kind to provide secret examination of every person passing through said walk-gate.

At least one walk-gate in said partitioning is preferably supplied with at least one door with a respective drive mechanism connected to a drive signal output of an information control-and-processing device.

A detector of forbidden articles and/or substances is preferably supplied with an X-ray scanning radiation source and an X-ray receiver that is co-linear to said X-ray radiation and is connected to the information inputs of an information control-and-processing device.

An X-ray radiation source of said detector of forbidden articles and/or substances is made to generate a flat fan-shaped X-ray beam in the walk-gate plane and can be disposed behind the bottom part of one of the side walls of said walk-gate provided with, at least, one X-ray transparent portion or it can be built-in into said bottom part of one of said walk-gate side walls.

An X-ray receiver of said detector made as a vertical linear X-ray receiver can be built-in into the walk-gate element opposite to said X-ray radiation source, while preferably said element that is used to build-in said X-ray receiver is a movable door with a drive mechanism of said door made so that it maintains the pre-defined ratio of the door motion speed and of the scanning rate of an X-ray radiation source.

An X-ray receiver of said detector made as a vertical linear X-ray receiver can be disposed behind the walk-gate element opposite to said X-ray radiation source, for example, behind the walk-gate second side wall provided with, at least, one X-ray transparent portion.

An X-ray receiver of said detector made as a horizontal linear X-ray receiver can be disposed under the walk-gate floor provided with, at least, one X-ray transparent portion or built-in into said walk-gate floor.

An X-ray receiver of said detector made as a horizontal linear X-ray receiver can be disposed above the walk-gate ceiling provided with, at least, one X-ray transparent portion or built-in into said walk-gate ceiling.

Preferably a walk-gate is additionally supplied with a sensor to define the presence of a person ready to pass through said walk-gate with an output of said sensor being connected to the input for activating an X-ray radiation source.

The implementation examples of the present invention are illustrated in the following drawings.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
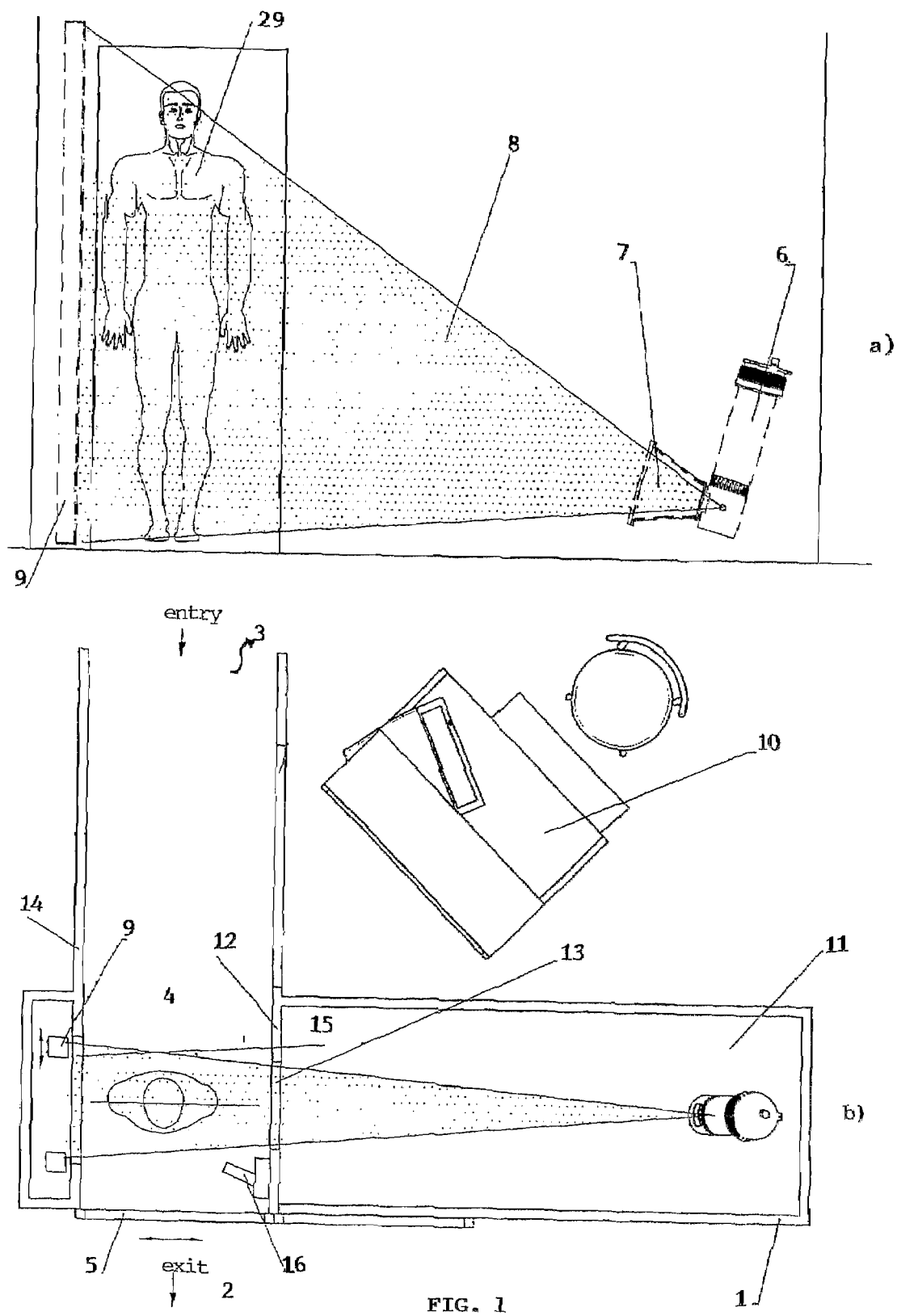
FIG. 1 is a schematic diagram of an implementation example of a system filed wherein both an X-ray radiation source and an X-ray receiver are disposed behind the walk-gate walls: (a)—a front view, b—a plane view.

A system filed according to any of its implementations is comprised of a partitioning 1 separating a protected area 2 from an unprotected area 3. A partitioning 1 is comprised of at least one walk-gate 4 leading from an unprotected area 3 to a protected one. A walk-gate 4 is closed with, at least, one door 5 which is preferably made a movable one. A system also comprises a detector of forbidden articles and/or substances comprised of an X-ray radiation source 6 supplied with a collimator 7 for generating a flat fan-shaped X-ray beam 8 in the plane of a walk-gate 4 and an X-ray receiver 9 that is co-linear to said X-ray beam 8. An X-ray receiver 9 in all implementations of a system filed is made a linear one and presents in itself a linear array of the elements for converting an X-ray radiation through a visible light into the digital electronic signals. Also there is provided an information control-and-processing device 10.

In the implementation example presented in FIG. 1 an X-ray radiation source 6 with a collimator 7 is located in the premises 11 that are disposed under the angle of 90° to a walk-gate 4 and are adjacent to a side-wall 12 wherein an X-ray transparent portion 13 is provided. In an opposite wall 14 of a walk-gate 4 there is also provided an X-ray transparent portion 15 with a vertical linear X-ray receiver 9 disposed further behind. An X-ray receiver is made a movable one so that it can be moved parallel to itself along a portion 15 in close synchronism with the scanning motion of an X-ray beam 8. An information control-and-processing device 10 is made as a computer-controlled work station equipped with special software to process the image thus received and also to control the synchronous motion of a collimator 7 and of an X-ray receiver 9. A walk-gate 4 is closed with a movable door 5. A sensor for defining the presence of a person ready to pass through said walk-gate in the implementation example described is made as a video camera 16 though it can be made by any means known to those skilled in the art.

Figure 3:
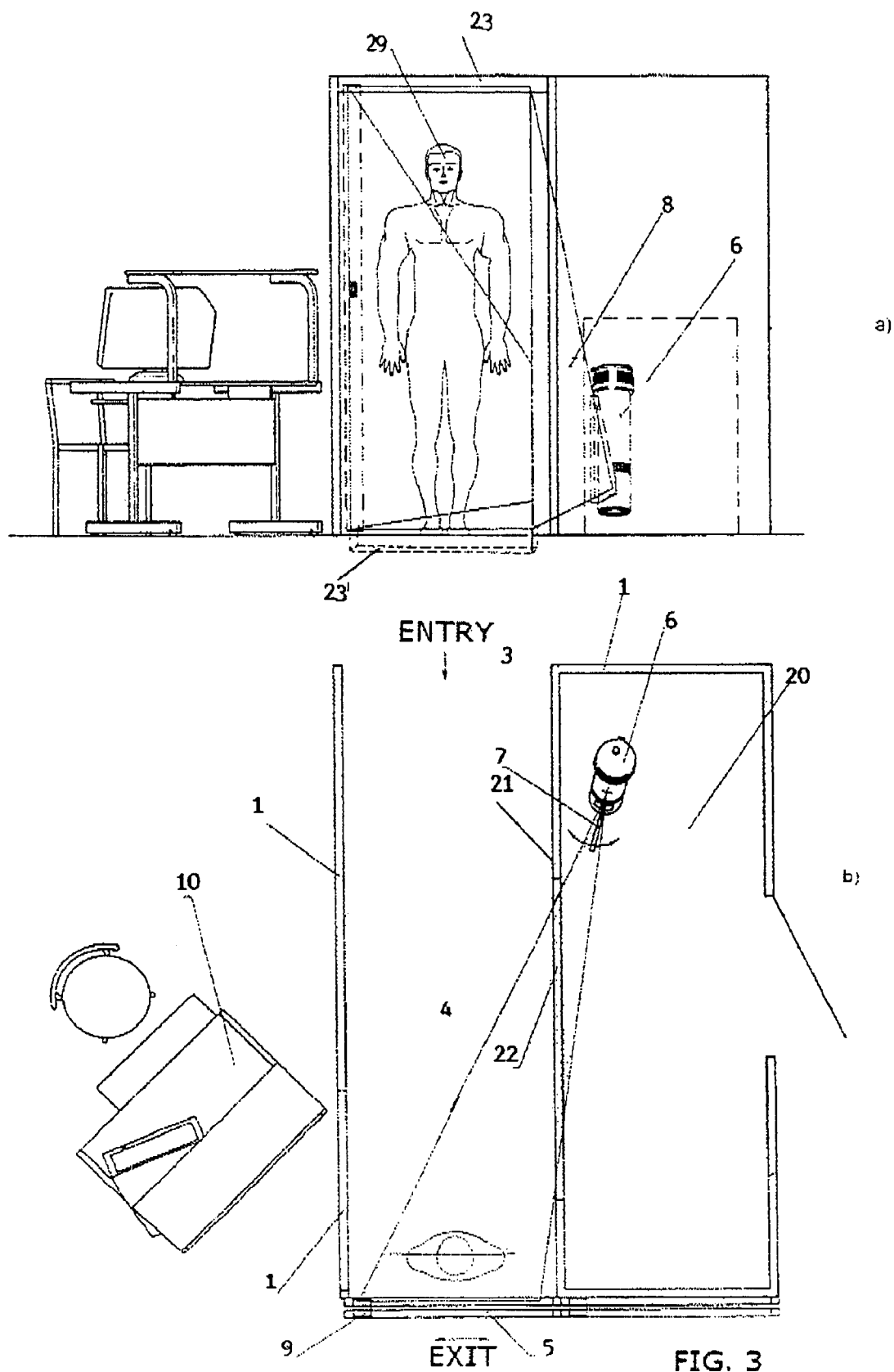
FIG. 3 is a schematic diagram of an implementation example of a system filed wherein an X-ray radiation source is disposed behind a walk-gate wall, and an X-ray receiver is disposed in a movable door: (a)—a front view, b—a plane view.

In the implementation example illustrated in FIG. 3 an X-ray radiation source 6 with a collimator 7 are disposed in the premises 20 parallel to a walk-gate 4. In their adjacent wall 21 there is provided an X-ray transparent portion 22. An end wall of a walke-gate 4 is closed with a movable door 5 with a vertical linear X-ray receiver 9 secured there on. The system is additionally supplied with a horizontal X-ray receiver 23 (or 23') disposed on the ceiling (or under the floor) of a walk-gate 4 across the latter, while the scanning flat fan-shaped X-ray beam 8 is generated in such a way that to enclose both a vertical detector 9 and a horizontal X-ray receiver 23. An information control-and-processing device 10 is made as a computer-controlled work station equipped with special software to process the image thus received and also to control the synchronous motion of a collimator 7 and of an X-ray receiver 9. A drive mechanism (not shown in the drawings) of a door 5 is made so that it maintains the pre-defined ratio of the door motion speed and of the scanning rate of an X-ray radiation source and is coupled to an output of an information control-and processing device 10.

An X-ray radiation source 6 can be secured in the wall of a walk-gate 4. However, the most preferable one is the position illustrated in FIG. 4 with a an X-ray radiation source 6 and a collimator 7 disposed in the premises 24 adjacent to a walk-gate 4, while an X-ray transparent portion 26 is provided in their adjacent wall 25. A vertical linear X-ray receiver 9 is secured on the opposite wall 27 of a walk-gate 4. A flat fan-shaped X-ray beam is generated in such a way that it could hit upon a vertical X-ray receiver 9 with high precision. Scanning is provided by means of the walk-gate floor 28 that is moving with a constant speed i.e. according to the principle of "a moving pavement" or an escalator. Such implementation of a system filed is especially suitable for the pedestrian subways in the airports where a wide use is made of such "moving pavements" or escalators. An information control-and-processing device 10 is made as a computer-controlled work station equipped with special software to process the image thus received and also to control the motion of the floor 28.

The operation of the system filed is performed in the following way.

An X-ray radiation source emits a flow of X-ray beams to be shaped by a collimator 7 into one flat vertical X-ray beam 8.

A collimator 7 and an X-ray receiver 9 are pre-set in such a manner that a vertical X-ray beam 8 hits upon an X-ray receiver 9 with high precision.

A highly precise synchronous movement can be provided, for example, by means of positioning a collimator 7 and an X-ray receiver 9 (or a door 5) on the respective horizontal guides and their movement there along said guides by means of the step motors (not shown in the drawings).

The synchronization design concepts of the motion system are described, for example, in [International Application WO02/7306, Int.Cl. G01N23/00, Published Apr. 4, 2002]. During scanning an X-ray receiver 9 is moved with a constant speed. A collimator 7 is moved in synchronism with the motion of an X-ray receiver 9 in such a manner that a slot shadow projection of a collimator 7 from an X-ray beam emitted by an X-ray radiation source 6 is constantly located on an X-ray receiver 9.

As it follows from the similarity considerations to provide the constant projection of a collimator 7 on an X-ray receiver throughout the scanning range it is sufficient to perform the motion of both components with time according to one and the same law. Such design concept of a motion system makes it possible to provide its technical implementation by relatively simple means i.e. to make the motion a synchronous one a collimator 7 and an X-ray receiver 9 should be moved with constant speeds.

A synchronous motion of a collimator 7 and that of an X-ray receiver 9 is achieved due to highly precise ratio of their speeds. Since the rotational speed of the step motors is in the end defined by the switching rate of its windings to provide the synchronous motion it is necessary to synthesize the two frequencies having the precisely defined ratio. The possibility is also provided to vary said ratio in very small increments.

A sensor 24 for defining the presence of a person ready to pass through a walk-gate 4 supplies the signal of the presence of said person and in this way activates an X-ray radiation source 6. A sensor 24 can be made, for example, as a video camera as it is shown in FIG. 1.

Figure 2:
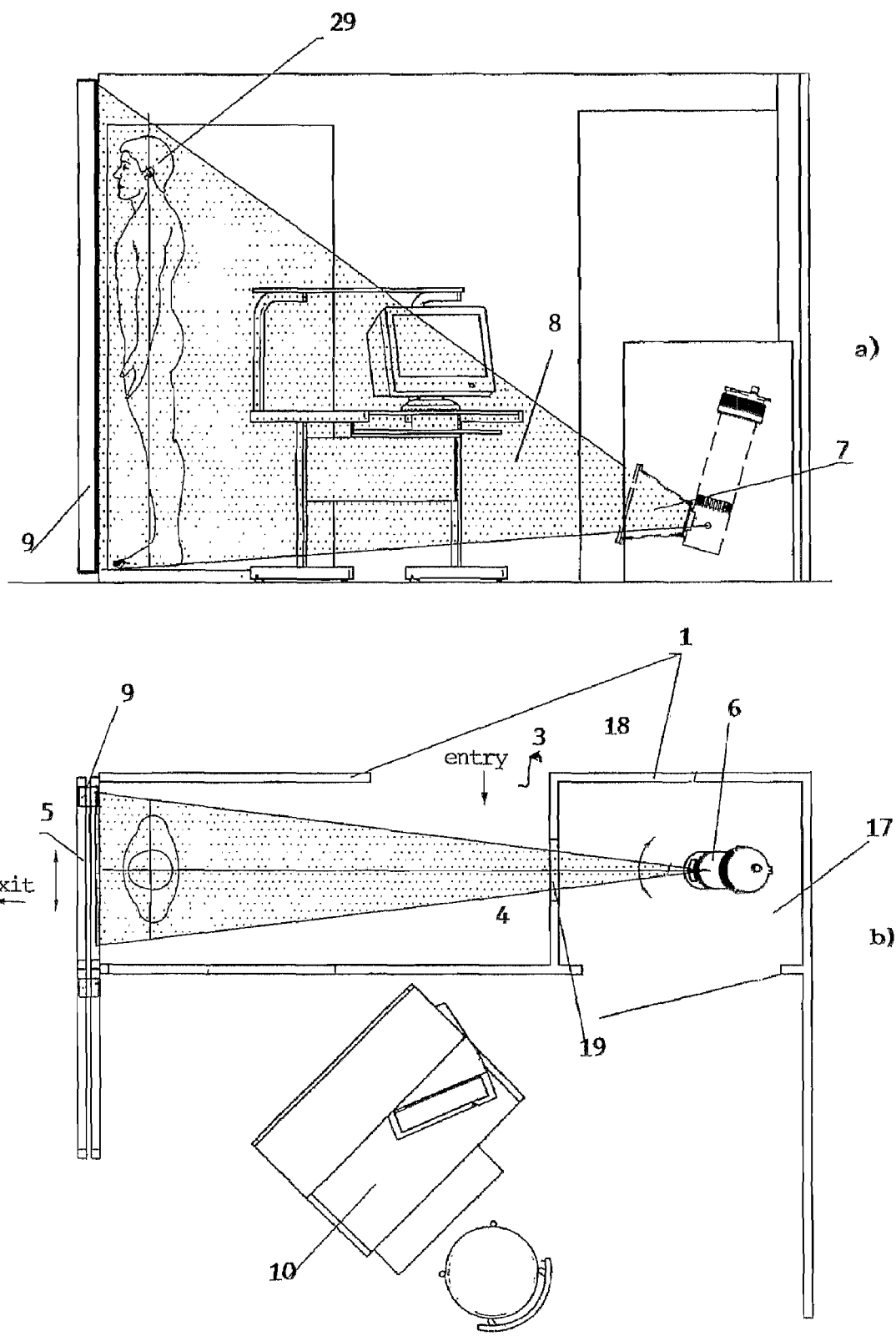
FIG. 2 is a schematic diagram of an implementation example of a system filed wherein an X-ray radiation source is disposed behind a walk-gate wall, and an X-ray receiver is disposed in a movable door: (a)—a front view, b—a plane view.
Figure 4:
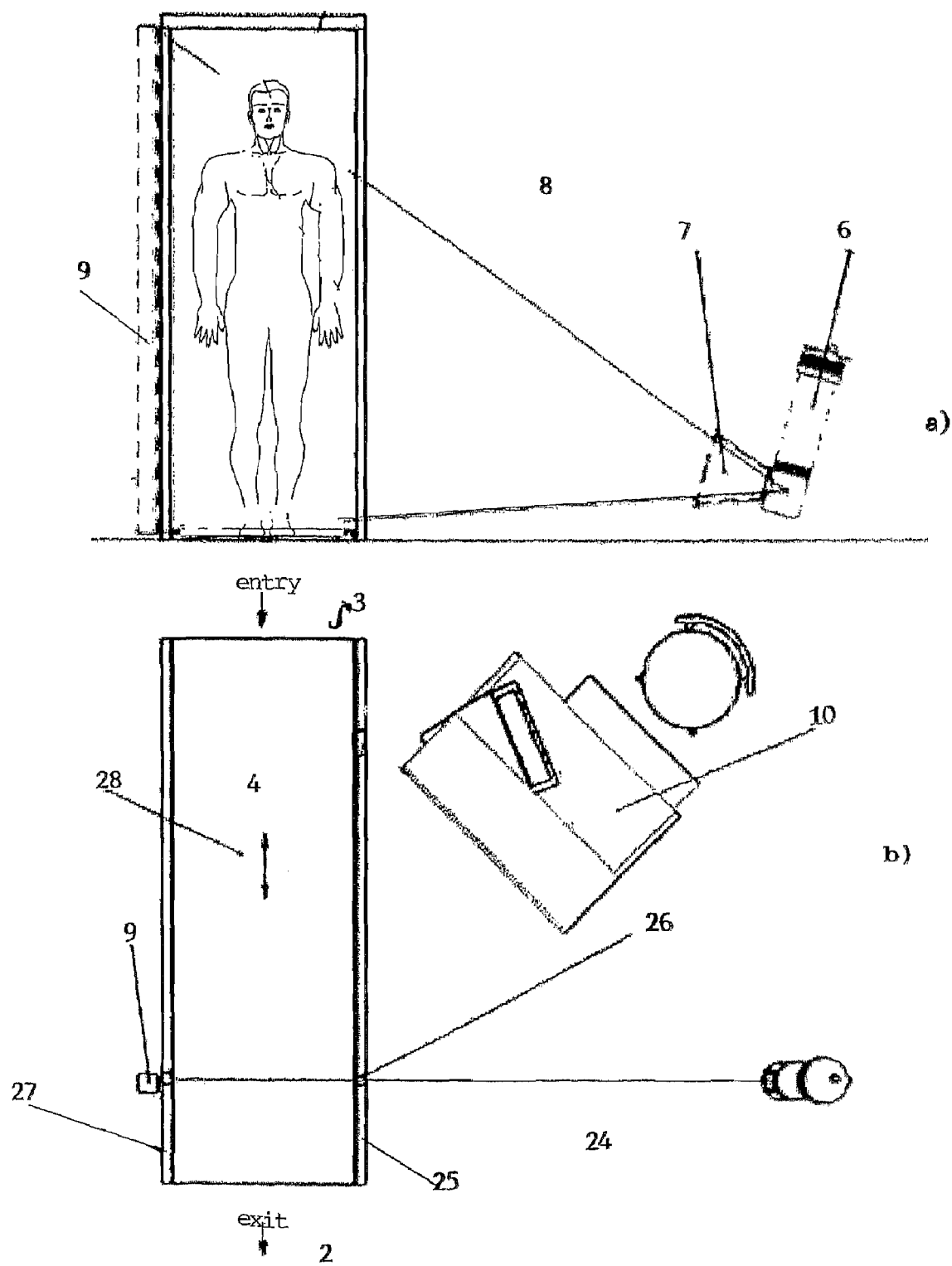
FIG. 4 is a schematic diagram of an implementation example of a system filed wherein an X-ray radiation source is disposed behind a walk-gate wall and, an X-ray receiver is disposed in said walk-gate wall: (a)—a front view, b—plane view.

An X-ray beam 8 is passed through the X-ray transparent portions 13, 19, 22 or 26 of the walls 12, 18, 21, 25 (FIGS. 1, 2, 3, 4 respectively) or without the latter and further through a human body 29 and then through an X-ray transparent portion 15 of a wall 14 (FIG. 1) or directly (FIGS. 2, 3 or 4)

and at each given scanning interval it hits upon an X-ray receiver 9 with the resulting read-out of the electronic digital signals. The output electronic digital signals are supplied to the information control-and-processing device 10 that generates the image of a person 29 being examined. Due to the projection characteristics of the image thus received just one passing of a person being examined through a walk-gate provides the required information about the presence of forbidden articles and/or substances both on the surface and in the internal cavities of a human body.

To improve the safety of a system filed the latter can be additionally supplied with two more doors (not shown in the drawings) disposed after said movable door 5 and controlled by an information control-and-processing device 10. These doors can be operated, for example, as it is described in [US 2003020607, Int.Cl. G08B21/00, Published Jan. 30, 2003]. After scanning a person 29 passes through a door 5 which is closed after him. Then before a person there is opened only one of the other two doors. If the analysis of the scanning image of a person under examination does not reveal any forbidden articles and/or substances, then there is opened one of the doors leading to the protected area. Should said analysis of the scanning image of a person under examination reveal some forbidden articles and/or substances, then there is opened another door leading to the inspection premises. The image analysis is performed by a computer-controlled work station or by more remote control devices. A person being examined is not aware of either the scanning or its results or of where the door he/or she is passing through leads to.

The maximum dose received by a person per one scanning is of 0.1 µZv which is in conformity with international radiation safety standards without any limitations as to the number of examinations including pregnant women and children. Such a low dose is achieved due to optimization of anode voltage and current of an X-ray radiation source 7 and the value of its output filter, the width of a collimator slot, the dimensions of X-ray sensitive components of an X-ray receiver 9 and the scanning time.

What is claimed is:

1. A security entrance system for preventing entry of forbidden articles and/or substances from a surrounding area to a protected one comprising:
   a partitioning separating a protected area from an unprotected one;
   at least one walk-gate made in said partitioning;
   an information control-and-processing device and a detector of forbidden articles and/or substances,
   wherein said detector of forbidden articles and/or substances comprises an X-ray radiation source to provide examination of a person passing through at least one walk-gate;
   wherein an X-ray receiver of said detector is made as a vertical linear X-ray receiver built-in into a walk-gate element opposite to said X-ray radiation source; and
   wherein said walk-gate element with said built-in X-ray receiver is a movable door with a drive mechanism of said door made so that it maintains a predefined ratio of a door motion speed and of a scanning rate of the X-ray radiation source.

2. The security entrance system as in claim 1, wherein at least one walk-gate in said partitioning is supplied with at least one door having a respective drive mechanism connected to a signal output of the information control-and-processing device.

3. The security entrance system as in claim 1, wherein said detector of forbidden articles and/or substances is comprised of an X-ray scanning radiation source and of an X-ray receiver that is co-linear to said X-ray radiation and is connected to information inputs of the information control-and-processing device.

4. The security entrance system as in claim 3, wherein said detector of forbidden articles and/or substances further comprises a horizontal linear X-ray receiver disposed under a walk-gate floor provided with at least one X-ray transparent portion or built-in into said walk-gate floor.

5. The security entrance system as in claim 3, wherein said detector of forbidden articles and/or substances further comprises a horizontal linear X-ray receiver built-in into a walk-gate floor.

6. The security entrance system as in claim 3, wherein said detector of forbidden articles and/or substances further comprises a horizontal linear X-ray receiver disposed above a walk-gate ceiling provided with at least one X-ray transparent portion.

7. The security entrance system as in claim 3, wherein said detector of forbidden articles and/or substances further comprises a horizontal linear X-ray receiver built-in into a walk-gate ceiling.

8. The security entrance system as in claim 1, wherein said X-ray radiation source of said detector of forbidden articles and/or substances is made to generate a flat fan-shaped X-ray beam in a walk-gate plane and can be disposed behind a bottom part of one of the walk-gate side walls provided with at least one X-ray transparent portion.

9. The security entrance system as in claim 1, wherein said X-ray radiation source of said detector of forbidden articles and/or substances is made to generate a flat fan-shaped X-ray beam in a walk-gate plane and is built-in into a bottom part of one of the walk-gate side walls.

10. The security entrance system as in claim 1, wherein said walk-gate is additionally supplied with a sensor to define a presence of a person ready to pass through said walk-gate with an output of said sensor being connected to an input for activating the X-ray radiation source.

* * * * *